United States Patent
Lin et al.

(10) Patent No.: US 10,430,637 B2
(45) Date of Patent: Oct. 1, 2019

(54) FINGERPRINT IDENTIFICATION UNIT

(71) Applicant: KEYCORE TECHNOLOGY CORP., Zhubei (TW)

(72) Inventors: Wei-Cheng Lin, Zhudong Township, Hsinchu County (TW); Chien-Jen Hsiao, Zhudong Township, Hsinchu County (TW); Shih-Hsiu Tseng, Zhudong Township, Hsinchu County (TW)

(73) Assignee: Keycore Technology Corp., Zhubei (TW)

( * ) Notice: Subject to any disclaimer, the term of this patent is extended or adjusted under 35 U.S.C. 154(b) by 332 days.

(21) Appl. No.: 14/946,733

(22) Filed: Nov. 19, 2015

(65) Prior Publication Data

US 2017/0147848 A1    May 25, 2017

(51) Int. Cl.
*G06K 9/00* (2006.01)
*G06F 3/044* (2006.01)

(52) U.S. Cl.
CPC ......... *G06K 9/00053* (2013.01); *G06F 3/044* (2013.01); *G06F 2203/04103* (2013.01)

(58) Field of Classification Search
CPC ... G06F 3/041; G06K 9/0002; G06K 9/00053
See application file for complete search history.

(56) References Cited

U.S. PATENT DOCUMENTS

| | | | |
|---|---|---|---|
| 2015/0301667 A1* | 10/2015 | Yano | G06F 3/0412 345/173 |
| 2016/0210494 A1* | 7/2016 | Zhao | G06K 9/0002 |
| 2016/0232395 A1* | 8/2016 | Han | G06K 9/0002 |
| 2016/0307022 A1* | 10/2016 | Lin | G06K 9/00033 |

* cited by examiner

*Primary Examiner* — Alexander Eisen
*Assistant Examiner* — Kebede T Teshome
(74) *Attorney, Agent, or Firm* — C. G. Mersereau; DeWitt LLP

(57) ABSTRACT

A fingerprint identification unit is directly integrated into a touch panel, a Color Filter (CF), a Thin-Film Transistor (TFT), or a Liquid Crystal Module (LCM) to largely increase the identified sensitivity to solve the problem of the conventional fingerprint identification unit that is required to form on a silicon wafer first.

6 Claims, 6 Drawing Sheets

FINGERPRINT IDENTIFICATION UNIT

FIELD OF THE INVENTION

The present invention relates to a fingerprint identification unit, and more specifically, to a fingerprint identification unit that can be directly integrated into a touch panel, a Color Filter (CF), a Thin-Film Transistor (TFT), or a Liquid Crystal Module (LCM) to increase the identified sensitivity.

BACKGROUND OF THE INVENTION

As the advancement of multimedia technology, more and more smart-type portable devices, such as mobile phones, personal digital assistants (PDAs), digital cameras (DCs), notebook computers, tablet computers and wearable devices, have become indispensable to people in their daily life. These portable devices are usually used to store highly personal and private data, such as telephone directory, photos and so on. In the event such a portable device is lost or stolen, the personal and private data stored therein are very possibly be used by other unauthorized people to cause unnecessary losses to the device owner.

Therefore, certain identity authentication and authorization management are required for these types of portable devices to ensure protection of users' privacy. One of the currently available major ways of identity authentication is password protection. Only after entering a correct password, the user can use and control the portable device. However, password protection cannot offer sufficient data security, because the password is easily leaked or cracked. Also, it is troublesome if the user forgot the password. Hence, portable electronic devices using fingerprint identification for identity authentication have been developed. Since a person's fingerprints are unique, the use of these unique fingerprints as a way of identity authentication can provide much higher security and is more convenient for use because the fingerprints save users the trouble of remembering and entering the password.

The currently available fingerprint identification systems have been widely applied to hand-held devices or mobile devices. In most cases, the fingerprint identification device is separately provided on a fixed side of the keyboard of a notebook computer or at a fixed position on the back side or the bottom side of a hand-held mobile device without being effectively integrated into a touch screen of the hand-held mobile device to reduce the volume thereof. Furthermore, the conventional fingerprint identification chip package module includes a substrate, a chip, and a molded sealing body. The chip is mounted on and electrically connected to the substrate and the molded sealing body covers a surface of the substrate and the chip.

A currently available fingerprint identification unit is required to integrate into various sensing circuits, metal trace lines, or chips to form on a substrate made of a silicon wafer before combined with a touch panel or other devices. However, various elements are integrated into the fingerprint identification unit to cause bulky, so as to adversely affect fingerprint identified sensitivity.

Since the chip is covered by multiple layers of materials, the final chip package module is relatively thick and has relatively low sensitivity when a sensing area of the chip is touched by a finger.

Furthermore, the conventional slide-sensing fingerprint identification system is directional. It must be separately mounted and requires a lot of time to complete the fingerprint identification, and is therefore poor in terms of structural integration and convenience in use.

SUMMARY OF THE INVENTION

To solve the above problems, a primary object of the present invention is to provide a fingerprint identification unit, which can be directly integrated into a touch panel, a Color Filter (CF), a Thin-Film Transistor (TFT), or a Liquid Crystal Module (LCM) to largely increase the identified sensitivity to solve the problem of the conventional fingerprint identification unit that is required to form on a silicon wafer first.

To achieve the above and other objects, the fingerprint identification unit according to the present invention is formed on a base.

The base has a top and a bottom side, and the fingerprint identification unit is provided either on the top side or on the bottom side.

The fingerprint identification unit includes a first coating layer, a first fingerprint identification electrode layer, a second coating layer, a second fingerprint identification electrode layer, a conductor layer, and a third coating layer.

The first coating is disposed either on the top side or on the bottom side. The first fingerprint identification electrode layer is arranged on one side of the first coating layer opposite to the base and has a plurality of first fingerprint identification electrodes. The second coating layer covers the first fingerprint identification electrode layer. The second fingerprint identification electrode layer is arranged on one side of the second coating layer opposite to the first fingerprint identification electrode layer and has a plurality of second fingerprint identification electrodes. The conductor layer has a plurality of metal conductors, which are electrically connected to the first and the second fingerprint identification electrode layer. The third coating layer covers the second fingerprint identification electrode layer and part of the conductor layer.

With these arrangements, the fingerprint identification unit can be directly integrated into a touch panel, a Color Filter (CF), a Thin-Film Transistor (TFT), or a Liquid Crystal Module (LCM) to a reduced thickness, so as to largely increase the identified sensitivity.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
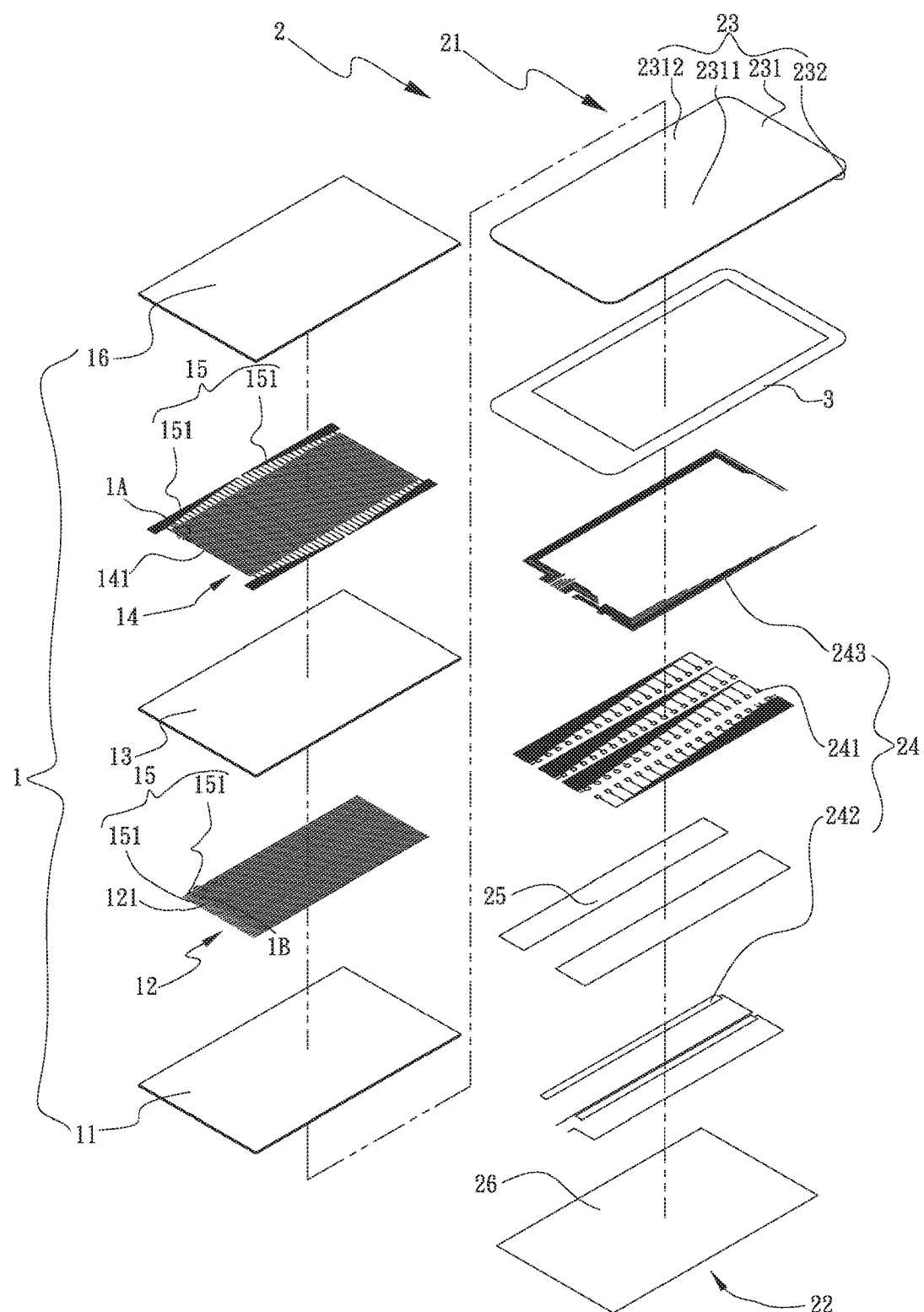
FIG. 1 is an exploded perspective view of a fingerprint identification unit according to a first embodiment of the present invention.

The present invention will now be described with some preferred embodiments thereof and by referring to the accompanying drawings. For the purpose of easy to understand, elements that are the same in the preferred embodiments are denoted by the same reference numerals.

Figure 1A:
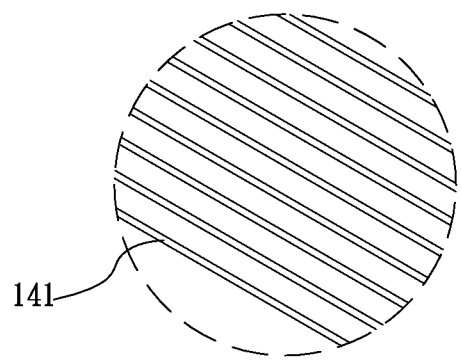
FIG. 1A is a partially enlarged view of a second fingerprint identification electrode included in the finger identification unit according to the first embodiment of the present invention.
Figure 1B:
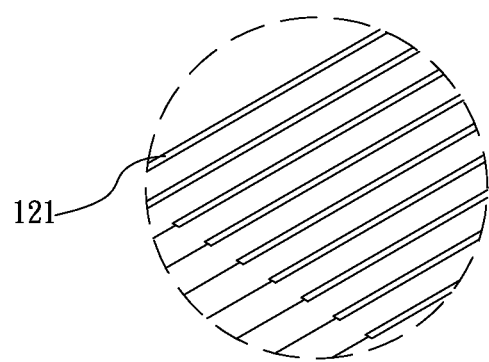
FIG. 1B is a partially enlarged view of a first fingerprint identification electrode included in the finger identification unit according to the first embodiment of the present invention.
Figure 2:
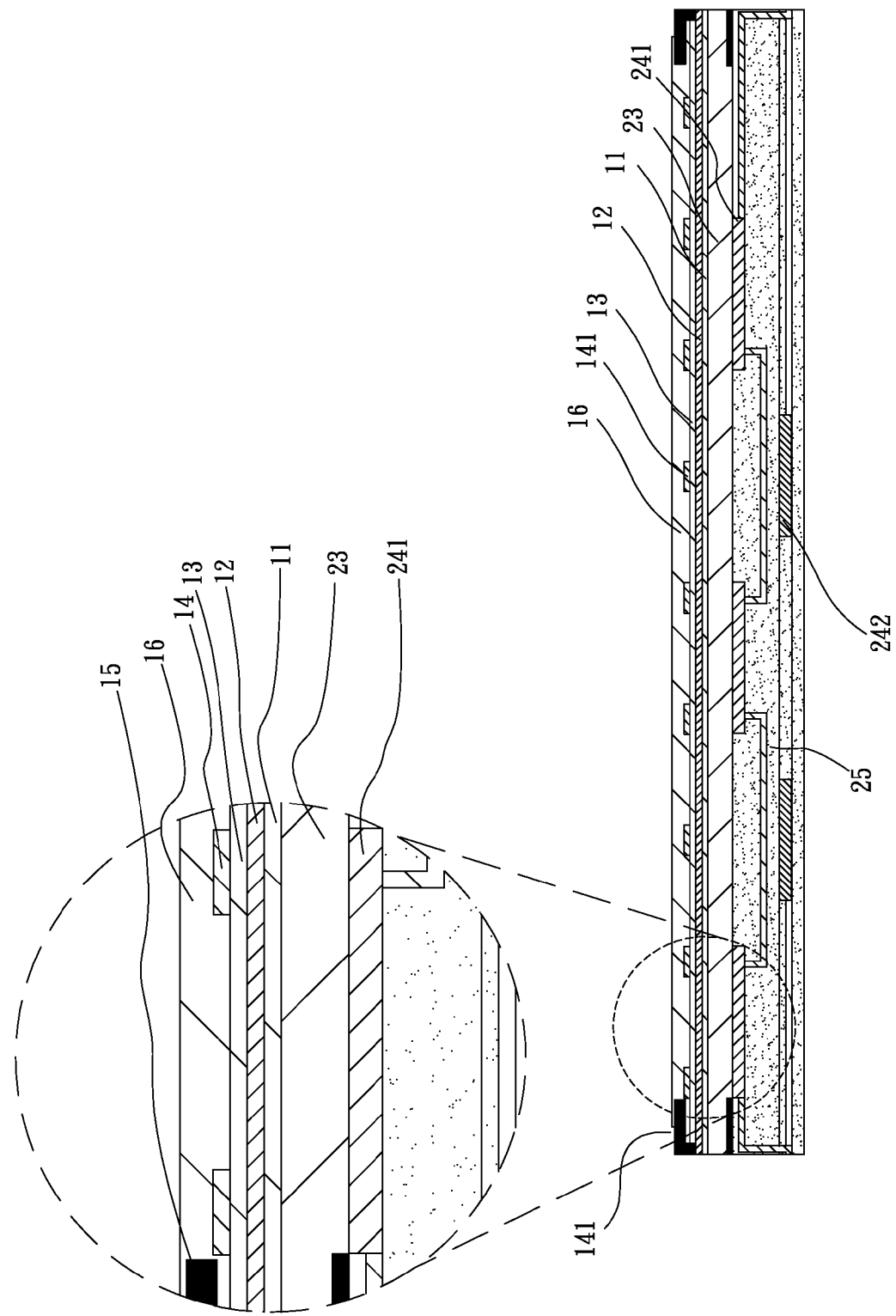
FIG. 2 is an assembled perspective view of the fingerprint identification unit according to the first embodiment of the present invention.

Please refer to FIG. 1, which is an exploded perspective view of a fingerprint identification unit 1 according to a first embodiment of the present invention, to FIGS. 1A and 1B, which are partially enlarged view of a second and a first fingerprint identification electrode, respectively, included in the finger identification unit 1 according to the first embodiment of the present invention, and FIG. 2, is an assembled perspective view of the fingerprint identification unit 1 according to the first embodiment of the present invention. As shown, the fingerprint identification unit 1 is formed on a base 2, which can be a touch panel, a Color Filter (CF), a Thin-Film Transistor (TFT), or a Liquid Crystal Module (LCM).

The base 2 has a top and a bottom side 21, 22, and in the illustrated first embodiment, the base 2 is, for example but not limited to, a touch panel. The fingerprint identification unit 1 is provided either on the top side 21 or on the bottom side 22. The base 2, namely the touch panel, includes a glass substrate 23, a touch electrode layer 24, a first insulating layer 25, a second insulating layer 26, and a shielding layer 3.

The glass substrate 23 has a first and a second surface 231, 232. The first surface 231 defines a touch zone 2311 and a non-touch zone 2312, which is located adjacent to the touch zone 2311 to surround a periphery of the touch zone 2311. The shielding layer 3 is disposed either on the first or the second surface 231, 232 located corresponding to the non-touch zone 2312. The touch electrode layer 24 is arranged on the touch zone 2311 of the first surface 231. The touch electrode layer 24 includes a plurality of first and second touch electrodes, and metal trace lines 241, 242, 243, which are selectively electrically connected to first and second touch electrodes 241, 242. The first insulating layer 25 is located below the first and the touch second electrodes 241, 242 to cover the same and fill spaces existing therebetween, whereas the second insulating layer 26 is located below the touch electrode layer 24 and the first insulating layer 25 to cover the same.

The fingerprint identification unit 1 includes a first coating layer 11, a first fingerprint identification electrode layer 13, a second coating layer 13, a second fingerprint identification electrode layer 14, a conductor layer 15, and a third coating layer 16.

The first coating 11 is disposed either on the top side 21 or on the bottom side 22 of the base 2. The first fingerprint identification electrode layer 12 is arranged on one side of the first coating layer 11 opposite to the base 2 and has a plurality of first fingerprint identification electrodes 121. The second coating layer 13 covers the first fingerprint identification electrode layer 12. The second fingerprint identification electrode layer 14 is arranged on one side of the second coating layer 13 opposite to the first fingerprint identification electrode layer 12 and has a plurality of second fingerprint identification electrodes 141. The conductor layer 15 has a plurality of metal conductors 151, which are electrically connected to the first and the second fingerprint identification electrode layer 12, 14. The third coating layer 16 covers the second fingerprint identification electrode layer 14 and part of the conductor layer 15.

The present invention is characterized in that the fingerprint identification unit 1 is to solve the problem of the conventional fingerprint identification unit that is required to form on a silicon wafer first.

Figure 3:
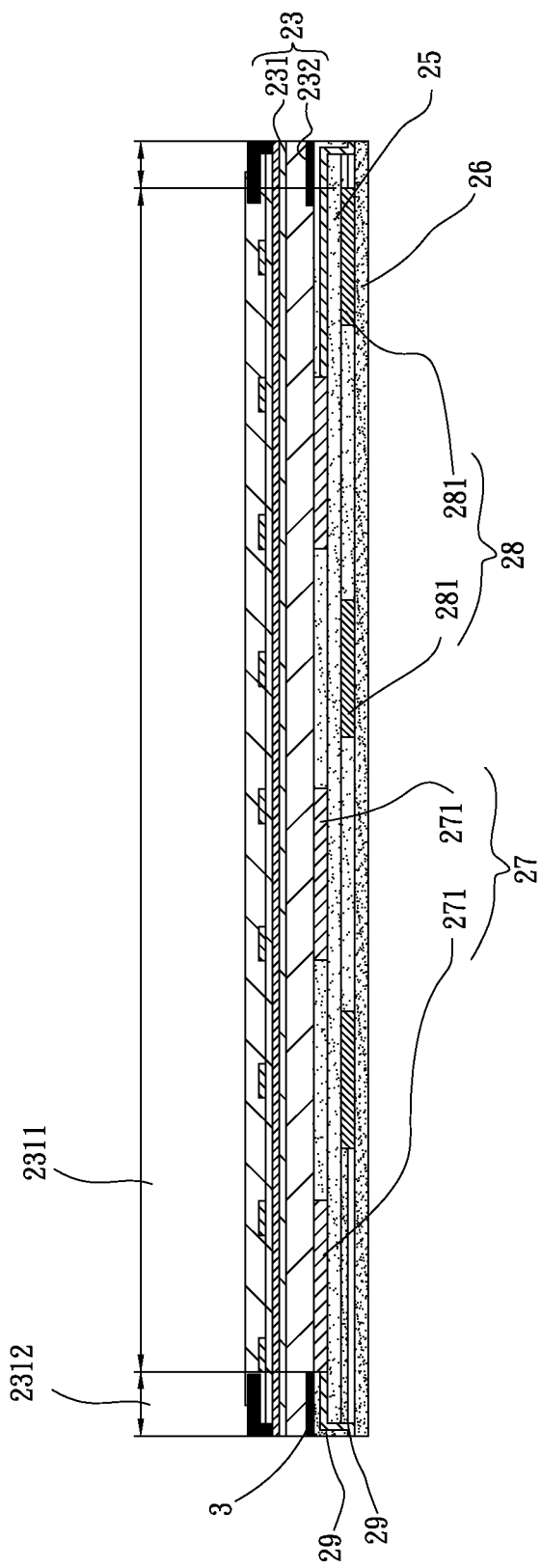
FIG. 3 is an assembled perspective view of the fingerprint identification unit according to a second embodiment of the present invention.

Please refer to FIG. 3, which is an assembled perspective view of the fingerprint identification unit 1 according to a second embodiment of the present invention. As shown, the second embodiment of the fingerprint identification unit 1 is generally structurally similar to the first embodiment except that, in this second embodiment, the base 2 includes a glass substrate 23, a first and a second touch electrode layer 27, 28, a first and a second insulating layer 25, 16, a metal trace line layer 29, and a shielding layer 3.

The glass substrate 23 has a first and a second surface 231, 232. The first surface 231 defines a touch zone 2311 and a non-touch zone 2312, which is located adjacent to the touch zone 2311 to surround a periphery of the touch zone 2311. The shielding layer 3 is disposed either on the first or the second surface 231, 232 located corresponding to the non-touch zone 2312. The first touch electrode layer 27 is disposed on the second surface 232, covered by the first insulating layer 25, and has a plurality of first touch electrodes 271, whereas the second touch electrode layer 28 is disposed on one side of the first insulating layer 25 opposite to the first touch electrode layer 27, covered by the second insulating layer 26, and has a plurality of second touch electrodes 281. The metal trace line layer 29 is selectively electrically connected to the first and the second touch electrode layer 27, 28.

In the illustrated first and second embodiments, the first, the second, and the third coating layer 11, 13, 16 is a silica film, with which the first, the second, and the third coating layer 11, 13, 13 respectively have increased adhesion when deposition is performed. The configurations of the first and the second fingerprint identification electrodes 121, 141 can be circles, squares, triangles, or trapezoids.

Figure 4:
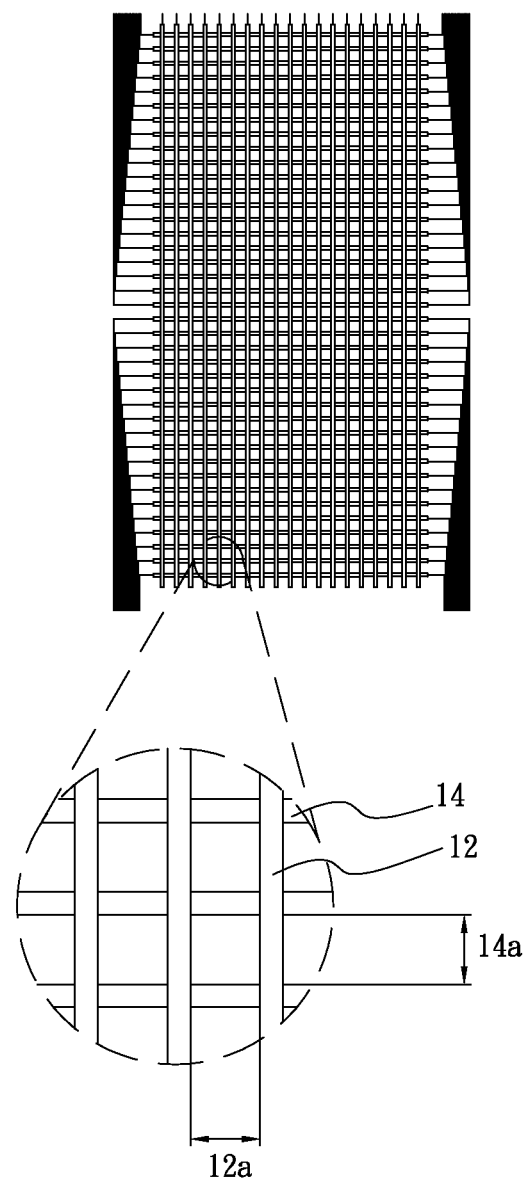
FIG. 4 is an example of use of view of the first and the second fingerprint identification electrodes included in the finger identification unit of the present invention.

Please refer to FIG. 4, which an example of use of view of the first and the second fingerprint identification electrodes included in the finger identification unit 1 of the present invention, along with FIG. 1. As shown. The first fingerprint identification electrodes 121 are connected to one another, whereas the second fingerprint identification electrodes 141 are connected to one another. The areas of first and the second fingerprint identification electrodes 121, 141 are 20 um$^2$ to 50 um$^2$. The first fingerprint identification electrodes 121 are extended towards two side of the first fingerprint identification layer 12, an interval of 10 um~40 um is formed between each two first fingerprint identification electrodes 121, and the optimum value of the interval is 38 um, whereas the second fingerprint identification electrodes 141 are extended towards two sides of the second fingerprint identification layer 14, an interval of 10 um~40 um is formed between each two second fingerprint identification electrodes 141, and the optimum value of the interval is 38 um. Both the first and the second fingerprint identification electrodes 121, 141 are transparent electrodes.

Figure 5:
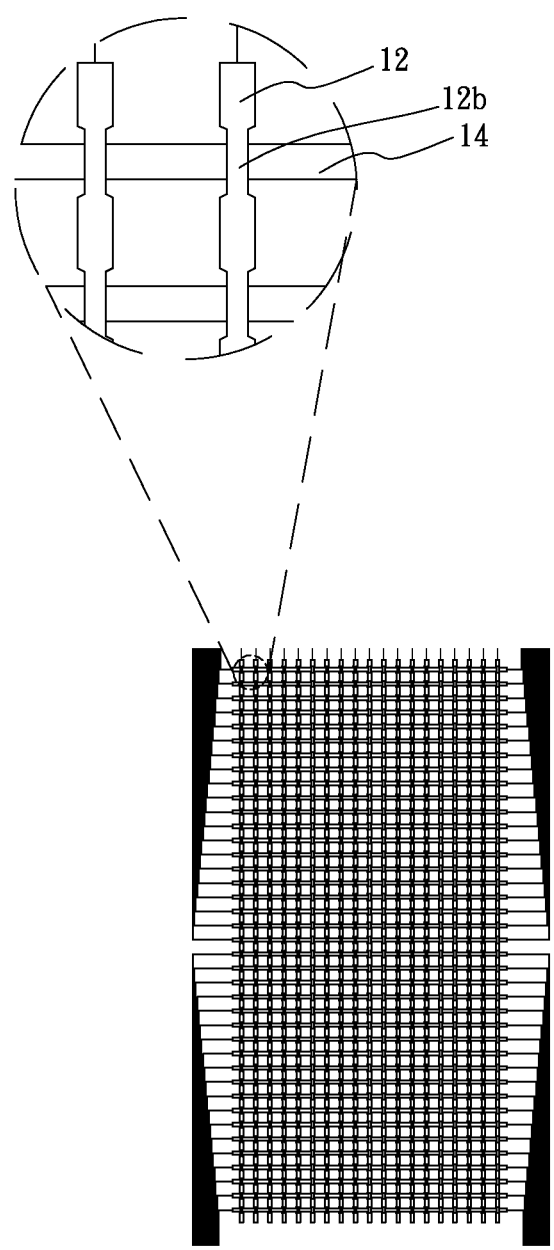
FIG. 5 is another example of use of view of the first and the second fingerprint identification electrodes included in the finger identification unit of the present invention.

Please refer to FIG. 5, which is another example of use of view of the first and the second fingerprint identification electrode included in the finger identification unit 1 of the present invention. As shown, each first fingerprint identification electrode 121 has a width of 10 um to 30 um, whereas each second fingerprint identification electrode 141 has a thickness of 10 um to 30 um, and a junction of each the first and the second fingerprint identification electrode 121, 141 has a width of 10 um.

By directly integrated into a touch panel or other display elements, the fingerprint identification unit 1 can has reduced overall thickness without the need of silicon substrate used as base materials, so as to largely increase fingerprint identified sensitivity.

A silica film as a base material is deposited on a predetermined location, where the fingerprint identification unit 1 is arranged, of a display element to increase adhesion by deposition coating before a film, which could be used as fingerprint identification electrodes, is deposited onto the first coating layer 11. The first fingerprint identification electrodes 121 are later disposed onto the first coating layer 11 by lithography and etching process to form part of the metal conductors 151, which are electrically connected to the first fingerprint identification electrodes 121. A silica film is then deposited to cover the first fingerprint identification electrodes 121 to form the second coating layer 13 for insulating, and a film, which could be used as fingerprint identification electrodes, is deposited onto the second coating layer 13. The second fingerprint identification electrodes 141 are later disposed onto the second coating layer 13 by lithography and etching process to form part of the metal conductors 151, which are electrically connected to the second fingerprint identification electrodes 141. A silica film is then deposited to cover the second fingerprint identification electrodes 141 and the metal conductors 151 to form the third coating layer 16 for insulating, With these arrangements, the fingerprint identification unit 1 can disposed on any desired location of display elements without the need of silicon substrate used as base materials, so that the fingerprint identification unit 1 can have largely reduced thickness, so as to largely increase fingerprint identified sensitivity.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fingerprint identification unit formed on a base, having a top and a bottom side, comprising:
    a first coating layer disposed either on the top side or on the bottom side of the base and being a film layer, not a silicon substrate, the first coating layer being a base layer for the fingerprint identification unit;
    a first fingerprint identification electrode layer disposed on one side of the first coating layer opposite to the base and having a plurality of first fingerprint identification electrodes;
    a second coating layer covering the first fingerprint identification electrode layer;
    a second fingerprint identification electrode layer disposed on one side of the second coating layer opposite to the first fingerprint identification electrode layer and having a plurality of second fingerprint identification electrodes;
    a conductor layer having a plurality of metal conductors, which are selectively electrically connected to the first and the second fingerprint identification electrode layer; and
    a third coating layer covering the second fingerprint identification electrode layer and part of the conductor layer;
    wherein the base is selected from a group consisting of a touch panel, a Color Filter (CF), a Thin-Film Transistor (TFT), and a Liquid Crystal Module (LCM); and
    wherein the first, the second, and the third coating layer being a silica film.

2. The fingerprint identification unit as claimed in claim 1, wherein configurations of the first and the second fingerprint identification electrodes are selected from a group of circles, squares, triangles, and trapezoids; and areas of the first and the second fingerprint identification electrodes are 20 $\mu m^2$ to 50 $\mu m^2$.

3. The fingerprint identification unit as claimed in claim 1, wherein an interval of 10 µm~40 µm is formed between each two first fingerprint identification electrodes, and an optimum value of the interval is 38 µm, whereas an interval of 10 µm~40 µm is formed between each two second fingerprint identification electrodes, and an optimum value of the interval is 38 µm.

4. The fingerprint identification unit as claimed in claim 1, wherein both the first and the second fingerprint identification electrodes are transparent electrodes.

5. The fingerprint identification unit as claimed in claim 1, wherein each first fingerprint identification electrode has a width of 10 µm to 30 µm, whereas each second fingerprint identification electrode has a thickness of 10 µm to 30 µm.

6. The fingerprint identification unit as claimed in claim 5, wherein a junction of each the first and the second fingerprint identification electrode has a width of 10 µm.

* * * * *